United States Patent [19]

Chang-Diaz

[11] Patent Number: 4,832,951

[45] Date of Patent: May 23, 1989

[54] METHOD OF INFUSION EXTRACTION

[75] Inventor: Franklin R. Chang-Diaz, Webster, Tex.

[73] Assignee: United States of America as represented by the Administrator, National Aeronautics and Space Administration, Washington, D.C.

[21] Appl. No.: 118,994

[22] Filed: Nov. 10, 1987

Related U.S. Application Data

[62] Division of Ser. No. 913,446, Sep. 30, 1986, Pat. No. 4,721,035.

[51] Int. Cl.$^4$ .................... A61K 35/12; A61K 35/78
[52] U.S. Cl. .................... 424/95; 424/195.1; 426/425; 426/432
[58] Field of Search ............... 424/95, 195.1; 426/425, 426/432

[56] References Cited

U.S. PATENT DOCUMENTS

| 3,224,880 | 12/1965 | Van Ike | 426/432 |
| 4,601,906 | 7/1986 | Shindler | 426/425 |
| 4,721,035 | 1/1988 | Chang-Diaz | 99/297 |

*Primary Examiner*—John W. Rollins
*Attorney, Agent, or Firm*—Hardie R. Barr; John R. Manning; Edward K. Fein

[57] ABSTRACT

Apparatus and method of removing desirable constituents from an infusible material by infusion extraction, where a piston operating in a first chamber draws a solvent into the first chamber where it may be heated, and then moves the heated solvent into a second chamber containing the infusible material, and where infusion extraction takes place. The piston then moves the solvent containing the extract through a filter into the first chamber, leaving the extraction residue in the second chamber.

20 Claims, 1 Drawing Sheet

4,832,951

METHOD OF INFUSION EXTRACTION

ORIGIN OF THE INVENTION

The invention described herein was made by an employee of the U.S. Government and may be manufactured and used by or for the Government for governmental purposes without the payment of any royalties thereon or therefor.

This is a division of application Ser. No. 06/913,446, filed 9/30/86, now U.S. Pat. No. 4,721,035.

FIELD OF THE INVENTION

This invention relates to infusion extraction machines, and more particularly to a apparatus for supplying solvent under pressure for use as an infusion extraction machine.

A common example of an infusion extraction machine is a coffee brewing machine, but its use is not limited thereto. Of particular importance in the application as a coffee-brewing machine is the special case of a coffee brewing machine for space applications where the beneficial use of gravity forces is not available. Other examples include use in obtaining natural flavorings (aroma and taste) from vegetable plants, the extraction of essences from spices, vegetable oils, as well as food products (such as sugar from beets), and the recovery of pharmaceutical products from plant roots, stems and leaves. The invention is also useful as a supercritical fluid extractor and as a pressure fermenter or digester. Any fluid capable of acting as a solvent may be used.

BACKGROUND OF THE INVENTION

Infusion extraction (also called "leaching", "washing extraction", "diffusional extraction", and "solvent extraction") is the preferential solution of one or more constituents of a solid mixture by contact with a fluid solvent. As used in this application, it may also include the washing or carrying away of constituents from the surface of insoluble material and, in addition to physical solution, per se, it may include physical dissolution or dissolution by chemical reaction and, additionally, includes the release of volatiles and aromatics from both soluble and insoluble matter by physical and or chemical action of the solvent. While the term "solvent" is used throughout this application it is to be understood that, depending on the process and the infusible material being extracted, the term may apply not only to water but also to steam, ethyl and isopropyl alcohol, petroleum napthas, hexane, trichlorethylene, acetone, perchlorothylene, chlorinated hydrocarbons, and other solvents used in the various extraction processes and, in addition, the term "solvent" as used in this application is not limited to solely the dissolving properties of a fluid but includes also any other fluid properties, physical or chemical, useful in infusion extraction such as, for example the physical washing of constituents by the fluid as well as osmotic mass transfer across membranes.

Infusion extraction processes usually involve the general steps of: reducing the size of particles of the infusible material, infusion extraction of the infusible material with a solvent, and separating the resulting extract and extraction residue.

Successful infusion extraction processes involve appropriate preparation of the solid infusible material prior to the infusion. Since in some cases small particles of the soluble material are surrounded by a matrix of insoluble-matter, the solvent must diffuse (as by osmosis) into the mass of material and the resulting solution or extract must diffuse out. Crushing and grinding of such solids will greatly accelerate the action. Vegetable and animal bodies are cellular in structure, and the natural products to be extracted from these materials are usually found inside the cells. Grinding, crushing, or rolling to various sizes are sometimes useful in rupturing the cell walls and thus exposing the material to be dissolved or washed in the extraction process. Different "grinds" of coffee, have been found preferable for different brewing processes. Grinding, however, hastens volatility. Ground coffee, for example begins to lose freshness when exposed to the air because of oxidation of the chemical ingredients that provide the flavor and aroma. The vacuum packing of coffee after grinding has, therefore, been practiced for many years. The flavor and fragrance industry utilizes the extracts and distillates of many natural products (flowers, leaves, stems, roots, fruits, etc.). These serve as key ingredients for the preparation of compounded flavors and fragrances. A problem facing aromatic extract producers is that many of the more important aromatic components of natural products are quite volatile and exist in extremely small concentrations i.e., parts per million and even parts per billion (Teraniski, et al, "Flavor Research, Principles and Techniques", Marcell Dekker, Inc., 1971, p.39). An extraction process wherein the infusible material remains hermetically sealed prior to and during extraction would, therefore, be advantageous.

Some ground material, e.g., coffee, swells when it absorbs liquid slowing the percolation of gravity-fed devices and if pressure is used to force liquid through the ground matter it is thereby compacted, thus even further reducing flow rates. Preferred routes, "tunnels" or "channels", may even be formed in the batch when water is allowed or forced to flow through the batch without agitation. In preferred routes or channels, a disproportionate amount of the liquid passes through the channels and the soluble constituents are leached from the particles adjacent to the channel depleting them early, and liquid later passing through the channels thus does not extract as much, while still other particles not adjacent to channels remain virtually unleached (i.e., there is no uniformity of contact between solvent and infusible material). That is, devices which pass solvent through the batch of infusible material negate the well known benefits of "agitation." Therefore, mixing liquid solvent and infusible solid material in a receptacle so that infusible material is suspended in this solvent, and then withdrawing the liquid extract may be preferable to forcing liquid through the infusible material. It would thus be advantageous to allow solvent to be moved into infusible material, agitating it and suspending it in the solvent, and thereby assuring more uniform contact with, and infusion extraction by, the solvent.

It is well known that relatively higher temperatures sometimes accelerate the infusion extraction process and generally the higher the temperature the faster and more complete the process and the higher the concentration of the extract. The increased rate is due, among other things, to lower viscosity when a liquid solvent is used. However, it is possible to get temperatures too high for the particular infusion material, sugar beets for example, yield undesirable solutes or cause chemical deterioration of the product if processed at too high a temperature. In other words, for any given product there is an optimum temperature or temperature range. For example, the non-profit Coffee Brewing Institute, Inc. of the Pan American Coffee Bureau, has recommended 195° F.±5° F. as the optimum water temperature for brewing coffee. It is desirable therefore, to permit close temperature control of the solvent-infusible material mixture.

Another important parameter of the infusion extraction process is the "steep" time or length of time the solvent is maintained in contact with the infusible material. In the case of coffee and tea, for example, too long a contact time results in a beverage which is too strong and bitter, whereas too short a contact time yields a weak drink. The time of infusion is critical for other products as well, and the time of percolation due to gravity, since it is dependent on a number of factors (particle size, geometric configuration of container, etc.) may be too long or too short for the optimum infusion extraction in a particular process. Spices, for example, are derived from various parts of plants; leaf, flower, fruit, and barks and while some are used in their natural state (after drying and grinding), there is quite a market for spice extracts (generally oleoresins). The oleoresins are usually separated by use of a solvent in infusion extractions and usually by gravity percolation of solvent through the ground solid. Various solvents may be used depending on the particular spice. Time of contact with solvent is a sensitive parameter determining not only the concentration of the extract but its composition as well, the solubility of some constituents depending on time of contact with the solvent as well as its temperature. The rate at which infusion extraction takes place depends on a number of variables of which incomplete knowledge is available at this time. The washing of a solution from the surface of impervious solid particles may be expected to be very rapid, requiring only the mixing of infusible material and solvent, whereas, leaching of a solute from the internal parts of a solid will be relatively slow. The rate of dialysis or osmosis, dissolving of solute from matrix of insoluble matter, and rate of chemical reaction etc. will all differ for different processes. It is well known, for example, that the properties of soybean oil differ depending on the relatively longer or shorter leaching times utilized. (Treybal, "Mass-Transfer Operations", McGraw-Hill, 1955, p628). The time required for percolation of a liquid through a ground solid depends, of course, on such things as the particular solid and liquid and the particle size and size of the batch, but for a given batch and solvent, the steep or contact time during percolation is of relatively fixed duration. It is desirable therefore, to facilitate close control over the time of contact of solvent with infusible material.

The ability to vary the pressure of the solvent/infusible material mixture may be advantageous for obtaining beneficial results, for example, to assist in breaking cell walls of infusion material. Also, pressurizing the solvent/batch mixture followed by a vacuum removal of the extract may facilitate collection of volatiles not otherwise released. It is advantageous to provide the capability to apply and control a desired pressure to aid the infusion extraction process.

It is apparent, therefore, that a number of variables; type of solvent, steep time, temperature, pressure and degree of agitation; have a significant influence on not only the speed and efficiency of the extraction process but also on the constitution of the extract itself. The ability to vary each, or any combination of these variables would be advantageous in a number of ways, for example, experimentation on a small scale to determine the optimum combination of parameters for extraction of a given infusible material before scaling up to produce it commercially.

DESCRIPTION OF RELATED ART

The movement of a solvent, such as heated water, by use of a piston through a chamber containing infusible material is known. Coffee brewing devices employing this principle are disclosed in numerous patents.

Many such devices depend on the force of gravity acting on the solvent or on weights bearing on the solvent to percolate or pressure percolate the solvent through the infusible material, for example, U.S. Pat. No. 3,804,635 to Weber. Others use compressed gasses or the force of the incoming resupply solvent for pressure percolation, for example, U.S. Pat. No. 3,451,329. to Herrera; 3,120,170, to Garte; and 3,583,308 to Williams. U.S. Pat. No. 3,565,641 to King employs a piston to force solvent through the infusible material and uses air to agitate solvent and infusible material. U.S. Pat. No. 4,189,991 to Haddad uses intermittently applied pressure to attempt to agitate the solvent and infusible material mixture.

All of the above patents disclose devices for moving solvent through the infusible material, and while one of them, U.S. Pat. No. 3,804,635 to Weber seeks to control the time of contact of solvent with infusible material by controlling the rate at which the solvent flows through the infusible material, none of the above patents teach suspending the infusible material in the solvent and controlling directly the contact time. Furthermore, none disclose returning the extract to the first chamber following its separation from the infusion residue and none teach preservation of the volatiles before, during and after extraction.

SUMMARY OF THE INVENTION

The present invention presents a new and improved device for the extraction of essential or desired ingredients of an infusible material without loss of the volatile constituents thereof.

It is an object of this invention to provide a means and method for operation in a low or micro-gravity environment.

It is another object of this invention to provide a means or method of infusion extraction wherein the infusible material and the extract therefrom remain hermetically sealed prior to, during and after extraction It is another object of this invention to provide a means and method for suspending the infusible material in a solvent and agitating it for more uniform contact therebetween.

It is an object also of this invention to provide a means and method of closely controlling the temperature of the solvent-infusible material mixture.

It is still another object of this invention to provide a means and method to facilitate close control over the time of contact of solvent with infusible material, and to provide a means and method to apply and control the pressure of the solvent-infusible material mixture.

A solvent is drawn into a first chamber by a piston disposed therein and wherein the solvent may be heated. The piston cooperating with appropriate valving is operative to move the solvent under pressure into a second chamber wherein the infusible material is suspended in the solvent. The time of contact of solvent and infusible material is directly controllable by a timely reverse actuation of the piston, separating the extract and extraction residue (as by a filter) and drawing the extract back into the first chamber where its temperature may be controlled.

The system is completely enclosed and held under pressure. As a result, during extraction the volatiles are contained. Upon reverse operation of the piston, the liquid extract and volatiles transfer to the first chamber. Again, volatiles are contained in the liquid and/or the head space. At the same time, the filter removes (segregates) the infusible material extraction residue.

The device can be used to repeatedly extract the infusible material using fresh solvent after removing the first extract from the upper chamber. If hot solvent is employed, the extract in the first chamber can be cooled directly and/or subjected to partial vacuum before withdrawal therefrom or valved into a separate vessel under partial vacuum for cooling.

One could also control the strength of the extract by partially removing extract of one strength and repeating the operation one more time with the remainder or add more fresh solvent to weaken it.

DESCRIPTION OF PREFERRED EMBODIMENTS

Figures 1, 2:
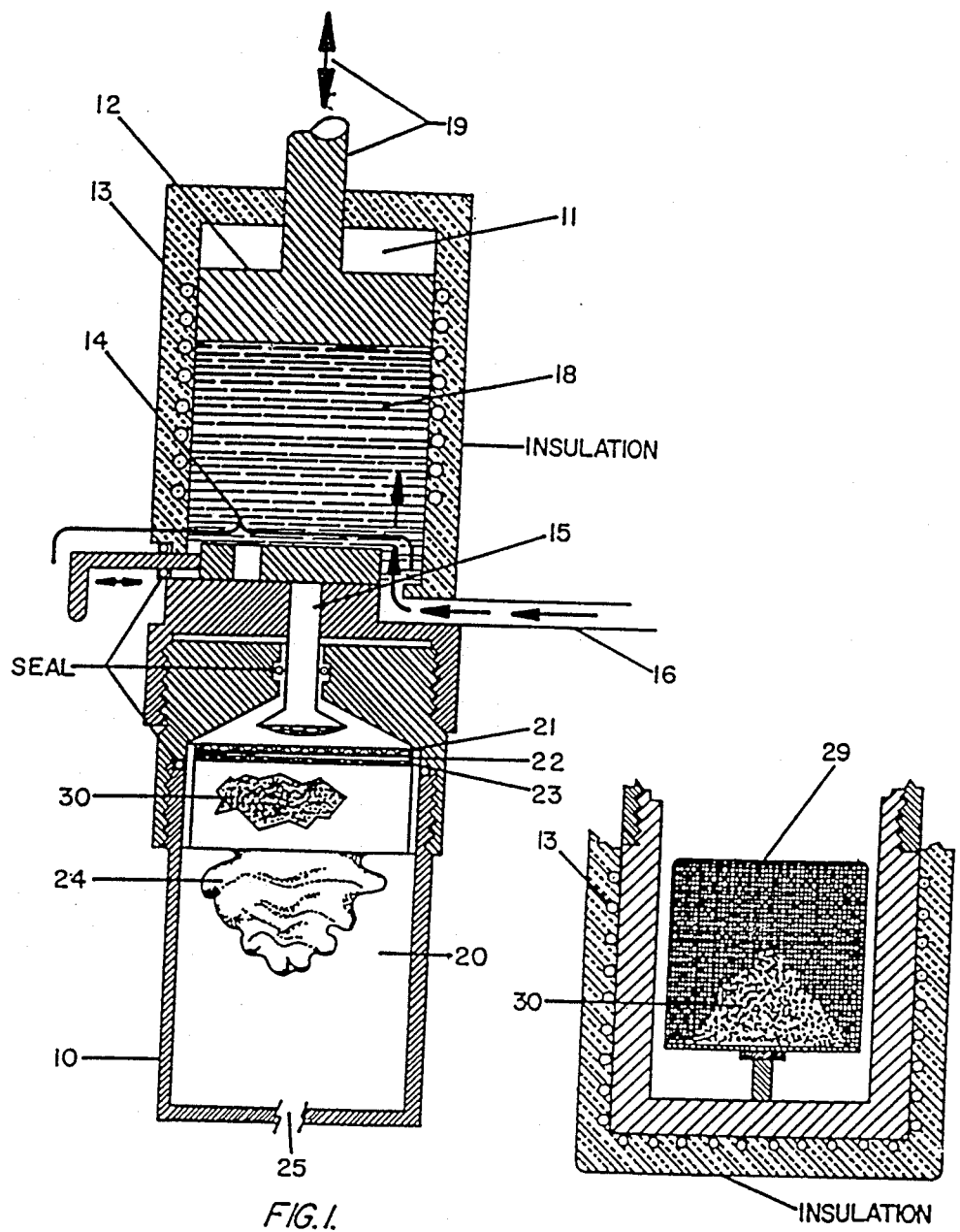
FIG. 1 is a cross sectional representation of the invention.
FIG. 2 is a cross sectional representation of infusion chamber in an alternate embodiment.

In FIG. 1 is shown an infusion extractor 10 configured as a zero gravity coffee or tea maker, including a fluid chamber 11 having a piston 12 disposed therein and being encased in a thermostatically controlled heating element 13 suitably insulated for controlling the temperature of its contents. Fluid chamber 11 is connected by a diverter valve arrangement 14, such as a three-way valve, to a fluid feed and dispense line 16 whereby fresh solvent 18, in this case water, may enter the fluid chamber 11 and also whereby after extraction, the extract may be dispensed.

A transfer tube 15 connects the fluid chamber 11 with an infusion chamber 20, wherein, in this embodiment, a flexible bladder 24 is disposed and further within which, the infusible material, here ground coffee, is enclosed. Infusion chamber 20 is provided with a vent 25 to facilitate expansion/collapse of the bladder 24 and its contents.

Intermediate of the fluid chamber 11 and the infusion chamber 20 and through which an intercommunicating fluid must pass, are disposed a first or upper perforated screen 21, a filter 22, and a second or lower perforated screen 23 so arranged that the screens 21 and 23 position and support the filter 22 against force exerted by pressure of any fluid passing from fluid chamber 11 to infusion chamber 20 and vice versa.

As shown in FIG. 1, valve 14 may be positioned such that upon actuation of piston 12, solvent 18 is drawn into chamber 11 from feed line 16 which is connected to a source of solvent supply. Piston 12 may be actuated up or down or to an intermediate position, depending on desired charge size, by hand or by any electrical, mechanical, hydraulic, pneumatic or other suitable actuator 19, under either manual or automatic control. Solvent 18 is heated to the desired temperature by a heating element 13 disposed within or adjacent the fluid chamber 12. Temperature of solvent 18 in the fluid chamber 11 may be controlled by any suitable electrical, mechanical or electromechanical method such as thermostats, timed heating cycle or temperature gage observations.

Once solvent 18 has attained the predetermined desired temperature, valve 14 is positioned and piston 12 is actuated so as to increase the pressure in fluid chamber 11 and thus to move the requisite size charge of the heated solvent through the perforated screens 21, 23 and filter 22 and into the bladder 24 of infusion chamber 20 containing the first batch of infusible material 30. The elastic resistance of the bladder 24, due to its composition, size, thickness and configuration is such as to exert a pressure on the solvent-infusible material mixture 31, amount of said pressure depending on the size of the charge or quantity of solvent 18 pumped into a given size bladder 24. The solvent-infusible material mixture 31, is allowed to steep or soak for a prescribed period of time.

After the prescribed steep time for the particular infusible material, solvent, and extract objectives, the valve 14 is positioned and the piston 12 is actuated so as to separate the extract 32 from the resultant extraction residue 33 by reducing the pressure in the fluid chamber 11 and thus drawing the extract through the perforated screens 21, 23 and filter 22 back into fluid chamber 11 where its temperature may be controlled (heated or maintained, in the specific embodiment) as required. For some extractions it may be advantageous to reduce the pressure on the extract once it is contained in fluid chamber 11. This may be accomplished quite readily in the present invention by closing valve 14 and moving piston 12 up to reduce pressure in fluid chamber 11.

After desired temperature of extract 32 has been achieved, valve 14 is positioned and piston 12 is actuated to dispense extract through feed/dispense line 16 for use or further processing.

In an alternate embodiment, passage of the solvent 18 into the infusion chamber 20 may be, by appropriate valving (not shown), made directly into the infusible material rather than through perforated screens 21, 23 and filter 22 if filtration is not required at this stage (as is the case in later removing extract 32 from extraction residue 33).

It is to be understood that heating of solvent (water) is normally required in coffee/tea making but cooling of solvent, extract, or solvent-infusible material combination to a desired temperature could as readily be accomplished by this invention.

In another alternative embodiment, infusion chamber 20 is a sealed pressure vessel wherein the infusible material, rather than being enclosed in a bladder, may be held in place by a screen basket (29 in FIG. 2), porous bag or similar arrangement and wherein the solvent may contact the infusible material under pressure.

In a further alternative embodiment the filter 22 and supporting perforated screens 21, 23 may be replaced by a porous bag or similar arrangement which contains the infusible material and infusion residue within the infusion chamber as solvent is injected and extract is withdrawn.

It should be noted that the common fluid feed and dispense line 16 as well as the slide valve 14 shown in FIG. 1 are illustrative of the specific embodiment only. Separate feed and dispense lines and other forms of multiple action valves or separate valves are also within the purview of the invention.

Also, rather than employing a heated solvent, many of the more valuable flavor and fragrance extracts are "cold pressed" since heat either destroys certain aromatic constituents or extracts components deemed undesirable. The invention could be used as an efficient and less destructive apparatus for preparing extracts of delicate aromatic plants. The device could also be used to extract aromatic components from animal organs, glands, and tissues, (e.g., musk).

The infusion extractor could as well be useful as a supercritical fluid extractor and as a pressure fermenter or digester.

Certain gases (e.g., carbon dioxide) display unique extractive properties when cooled and compressed to supercritical state. For example, supercritical carbon dioxide decaffeinates coffee without leaving a solvent residue. After extraction, the coffee is vented and the carbon dioxide escapes to the atmosphere. Similarly, supercritical fluids can be used to remove the oxidized fraction of cooking/frying oils and for a number of other applications.

The infusion extractor incorporates a piston which creates the pressure necessary to partially create supercritical conditions. Cooling is applied to fully attain supercritical conditions.

The operation of fermentation units at elevated temperatures and under moderate pressures is a rather recent innovation. The infusion extractor is capable of operating as a bio-reactor by applying the required pressure and heating the lower camber at thermophilic temperatures. The filter is quite useful since it can separate cells at the end of fermentation and present the fermentation media and end-products in a cell-free state.

I claim:

1. The process of infusion extraction of an infusible material, comprising the step of:
    drawing a solvent into a first chamber;
    placing the infusible material into a second chamber;
    heating the solvent to a desired temperature;
    transferring, independently of gravity forces, the heated solvent into the second chamber containing the infusible material;
    pressurizing to the desired pressure the solvent and the infusible material in the second chamber;
    holding the solvent and infusible material in the second chamber for a period of time effective for infusion extraction of the infusible material; and
    removing the extract thus formed into the first chamber leaving an extraction residue in the second chamber.

2. The method of claim 1 wherein further infusion extraction of the extraction residue is performed by the further steps as follows;
    transferring, independently of gravity forces, the contents of the first chamber into the second chamber containing the extraction residue;
    holding the contents of the second chamber for a period of time effective for infusion extraction of the contents of the second chamber; and
    removing the extract thus formed into the first chamber again leaving an extraction residue in the second chamber.

3. The method of claim 2 comprising the additional step of heating the contents of the first chamber before performing the further steps.

4. The method of claim 3 comprising the additional step of adding solvent to the contents of the first chamber before performing the additional step.

5. The method of claim 2 comprising the additional step of adding additional solvent to contents of the first chamber before performing the further steps.

6. The method of claim 1 comprising the further steps of
    adding additional infusible material to the extraction residue from the previous steps in the second chamber;
    transferring, independently of gravity forces, the contents of the first chamber into the second chamber;
    holding the contents of the second chamber for a period of time effective for infusion extraction of the extraction residue from previous steps and the additional infusible material; and
    removing the extract thus formed into the first chamber again leaving an extraction residue in the second chamber.

7. The method of claim 6 comprising the additional step of heating the contents of the first chamber before performing the further steps.

8. The method of claim 7 comprising the additional step of adding additional solvent to contents of the first chamber before performing the further steps.

9. The method of claim 6 comprising the additional step of adding additional solvent to contents of the first chamber before performing the further steps.

10. The method of claim 1 comprising the further steps of
    adding additional infusible material to the extraction residue from the previous steps in the second chamber;
    transferring, independently of gravity forces, the contents of the first chamber into the second chamber;
    holding the contents of the second chamber for a period of time effective for infusion extraction of the extraction residue from previous steps and the additional infusible material; and
    removing the extract thus formed into the first chamber again leaving an extraction residue in the second chamber.

11. The method of claim 10 comprising the additional step of heating the contents of the first chamber before performing the further steps.

12. The method of claim 11 comprising the additional step of adding additional solvent to contents of the first chamber before performing the further steps.

13. The method of claim 10 comprising the additional step of adding additional solvent to contents of the first chamber before performing the further steps.

14. The process of infusion extraction of an infusible material, comprising the steps of:
    opening a source valve between a source of solvent and an hermetically sealed first chamber,
    moving a piston within the first chamber to reduce the pressure in the first chamber,
    drawing solvent through the source valve into the first chamber,
    closing the source valve,
    applying heat to the solvent in the first chamber,
    controlling the temperature of the solvent in the first chamber,
    opening a transfer valve interconnecting the first chamber and a hermetically sealed second chamber wherein the infusible material is located,
    moving the piston within the first chamber to increase the pressure in the first chamber, transferring the heated solvent from the first chamber through the transfer valve into the second chamber, contacting the infusible material with the heated solvent for a period of time effective for infusion extraction to produce an extract and an extraction residue, moving the piston in the first chamber to reduce the pressure in the first chamber, separating the extract from the extraction residue by passing the extract through a filter, transferring the extract from the second chamber through the transfer valve to the first chamber, closing the transfer valve, heating the extract, controlling the temperature of the extract in the first chamber, opening a tap valve, moving the piston in the first chamber to increase the pressure in the first chamber, and drawing off the extract from the first chamber through the tap valve, and performing all steps hermetically.

15. The process of infusion extraction of an infusible material, comprising the steps of:

opening a source valve between a source of solvent and a first chamber, moving a piston within the first chamber to reduce the pressure in the first chamber, drawing solvent through the source valve into the first chamber, closing the source valve, applying heat to the solvent in the first chamber, controlling the temperature of the solvent in the first chamber, opening a transfer valve interconnecting the first chamber and a second chamber wherein the infusible material is located, moving the piston within the first chamber to increase the pressure in the first chamber, transferring the heated solvent from the first chamber through the transfer valve into the second chamber, contacting the infusible material with the heated solvent for a period of time effective for infusion extraction to produce an extract and an extraction residue, moving the piston in the first chamber to reduce the pressure in the first chamber, and separating the extract from the extraction residue by transferring the extract from the second chamber to the first chamber.

16. The process of infusion extraction of an infusible material, comprising the steps of:

drawing a solvent into a first chamber;

placing the infusible material into a second chamber;

heating the solvent to a desired temperature;

transferring, independently of gravity forces, the heated solvent into the second chamber containing the infusible material;

pressurizing to a desired pressure the solvent and the infusible material in the second chamber;

holding the solvent and infusible material in the second chamber for a period of time effective for infusion extraction of the infusible material;

removing the extract thus formed into the first chamber leaving an extraction residue in the second chamber; and drawing off a portion of the extract in the first chamber.

17. The method of claim 16 wherein further infusion extraction of the extraction residue is performed by the further steps as follows;

transferring, independently of gravity forces, the contents of the first chamber into the second chamber containing the extraction residue;

holding the contents of the second chamber for a period of time effective for infusion extraction of the contents of the second chamber; and removing the extract thus formed into the first chamber again leaving an extraction residue in the second chamber.

18. The method of claim 17 comprising the additional step of heating the contents of the first chamber before performing the further steps.

19. The method of claim 18 comprising the additional step of adding additional solvent to the contents of the first chamber before performing the additional step.

20. The method of claim 17 comprising the additional step of adding additional solvent to content of the first chamber before performing the further steps.

* * * * *